(12) United States Patent
Spiesshofer

(10) Patent No.: US 9,458,873 B2
(45) Date of Patent: Oct. 4, 2016

(54) CONNECTION ARRANGEMENT OF A DRIVE UNIT ON A SLIDE OF A PRESS

(71) Applicant: SCHULER PRESSEN GMBH, Goeppingen (DE)

(72) Inventor: Thomas Spiesshofer, Bermatingen (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 537 days.

(21) Appl. No.: 13/798,159

(22) Filed: Mar. 13, 2013

(65) Prior Publication Data
US 2013/0243519 A1 Sep. 19, 2013

(30) Foreign Application Priority Data
Mar. 14, 2012 (DE) .................. 10 2012 102 164

(51) Int. Cl.
| F16B 7/10 | (2006.01) |
| F16B 7/18 | (2006.01) |
| B30B 15/06 | (2006.01) |

(52) U.S. Cl.
CPC .............. *F16B 7/10* (2013.01); *B30B 15/068* (2013.01); *F16B 7/182* (2013.01); *Y10T 403/32229* (2015.01)

(58) Field of Classification Search
CPC ............... Y10T 403/15; Y10T 403/32229; Y10T 83/8696; Y10T 83/87; B30B 15/0035; B30B 15/068; B30B 15/0029; B30B 15/0041; F16B 7/10; F16B 7/182
USPC .................................. 100/219, 257
See application file for complete search history.

(56) References Cited

U.S. PATENT DOCUMENTS

| 2,938,453 | A | * | 5/1960 | Golding | ................. B30B 1/14 100/257 |
| 3,133,494 | A | * | 5/1964 | Hecht | .................. B30B 1/14 100/257 |
| 3,153,965 | A | * | 10/1964 | Muhlbach | ............ A43D 83/00 100/257 |
| 4,150,618 | A | | 4/1979 | Spanke et al. | |
| 4,206,701 | A | * | 6/1980 | Hemmelgarn | ...... B30B 15/0035 100/257 |
| 4,289,066 | A | * | 9/1981 | Proga | .................. B30B 15/284 100/257 |
| 4,677,908 | A | * | 7/1987 | Imanishi | ............ B30B 15/0035 100/257 |
| 4,953,383 | A | * | 9/1990 | Stiver | ................. B21D 39/046 100/257 |
| 5,345,861 | A | * | 9/1994 | Brewer | ............. B30B 15/0029 100/257 |

(Continued)

FOREIGN PATENT DOCUMENTS

| CN | 101954752 A | 1/2011 |
| CN | 201979711 U | 9/2011 |

(Continued)

*Primary Examiner* — Daniel P Stodola
*Assistant Examiner* — Matthew R McMahon
(74) *Attorney, Agent, or Firm* — Norman B. Thot

(57) ABSTRACT

A connection arrangement of a force- and movement-transmitting drive unit includes a press comprising at least a drive unit, a slide and a part with a thread. The drive unit is mounted at a pull or push point of the slide. A first connecting element comprises a nut mounted movably in the slide. The first connecting element and the part form a releasable connection. The part is releasably connected to an additional connecting part with a thread. The drive unit is connected to the slide via the releasable connection. The first connecting element is mounted movably in the slide. When the drive unit is in a released state or in a removed state, the additional connecting part can be separated from the part to at least partially remain in the first connecting element or in the releasable connection.

10 Claims, 1 Drawing Sheet

(56) References Cited

U.S. PATENT DOCUMENTS

| | | | |
|---|---|---|---|
| 5,349,902 A * | 9/1994 | Daniel | B30B 15/0035 100/257 |
| 5,609,099 A * | 3/1997 | Burns | B30B 15/0029 100/257 |
| 5,791,240 A | 8/1998 | Yagi et al. | |
| 6,012,322 A | 1/2000 | Itakura | |
| 6,679,164 B2 * | 1/2004 | Futamura | B30B 1/18 100/230 |
| 6,715,409 B2 | 4/2004 | Brewer et al. | |
| 8,141,482 B2 * | 3/2012 | Schaltegger | B21D 28/002 100/219 |
| 2001/0039888 A1 | 11/2001 | Imanishi | |
| 2003/0217651 A1 | 11/2003 | Brewer et al. | |
| 2013/0151002 A1 * | 6/2013 | Spiesshofer | B30B 1/266 700/206 |

FOREIGN PATENT DOCUMENTS

| | | |
|---|---|---|
| DE | 10 2011 052 860 A1 | 3/2012 |
| JP | 2000-225499 A | 8/2000 |
| JP | 2000-280094 A | 10/2000 |
| JP | 2002-144088 A | 5/2002 |
| JP | 2003-200298 A | 7/2003 |
| JP | 3689605 B2 | 6/2005 |

* cited by examiner

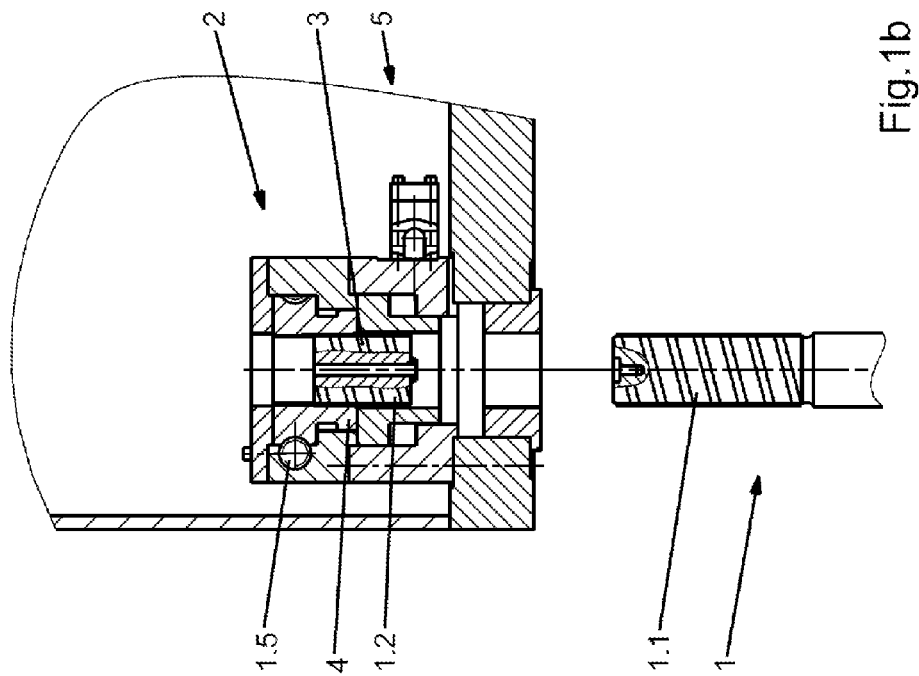
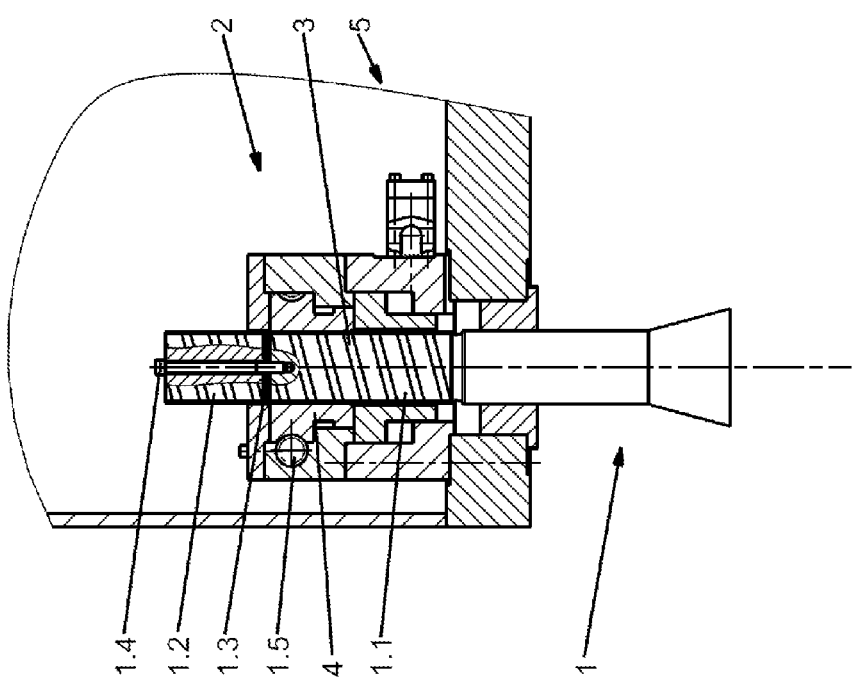

CONNECTION ARRANGEMENT OF A DRIVE UNIT ON A SLIDE OF A PRESS

CROSS REFERENCE TO PRIOR APPLICATIONS

Priority is claimed to German Patent Application No. DE 10 2012 102 164.3, filed Mar. 14, 2012. The entire disclosure of said application is incorporated by reference herein.

FIELD

The present invention relates to a connection arrangement of a force- and movement-transmitting drive unit which is, for example, designed as a pull or push element on a slide of a press, in which the slide is driven for its respective stroke, via this drive unit, by a drive device designed as a top or bottom drive.

BACKGROUND

Such connection arrangements are known, for example, in presses in which the stroke-executing slide is connected at at least one pull or push point to at least one force- and movement-transmitting drive unit. DE 10 2011 052 860 A1, for example, describes a press having a bottom drive where the drive unit is designed as what is known as a pull rod and can be connected by means of a releasable connection, such as, for example, a screw connection.

On the other hand, in a press having a top drive, the drive unit is designed as a push element or as a pull element and is connected correspondingly at a pull or push point.

In presses with both a top drive and with a bottom drive, a compact type of construction and a low overall height assume importance in economic terms, and, therefore the connection arrangements of said pull or push elements must also meet special structural and functional requirements.

Poor accessibility for maintenance and repair work is thus considered to be a disadvantage when, during demounting and remounting as a consequence of maintenance or transport, the force- and movement-transmitting drive units, for example, in presses with a bottom drive, the pull rods can be released and remounted only with great effort and in a complicated way.

This may be pertinent when, for an already proposed press with a bottom drive (as described in DE 10 2011 052 860 A1), the pull rods which transmit drive to the slide and which are connected in each case by means of a screw and nut at the pull/push point of the slide must be demounted and remounted for maintenance and repair work.

Connection arrangements for force- and movement-transmitting drive units for generic machines, such as presses, comprise machine elements known in many variations. For example, DE 28 47 478 A1 describes a circumferential part, a gearwheel and a locking nut. U.S. Pat. No. 6,715,409 B2 describes a connecting screw, an adjusting nut and a piston part. U.S. Pat. No. 5,791,240 A describes a cylinder body, a screw nut and a piston rod. By means of such solutions alone, however, complex problems such as special structural and functional requirements in presses both with top drive and with bottom drive in terms of a compact type of construction and a low overall height and/or accessibility for maintenance and repair work relating to the demounting and remounting of pull rods in presses with bottom drive, cannot be solved cost-effectively without further effort.

SUMMARY

An aspect of the present invention is to provide a connection arrangement of a force- and movement-transmitting drive unit such as is formed, for example, by a pull rod on a slide of a press with bottom drive or a push element on a press with top drive on a slide of a press, which connection arrangement allows for a technologically beneficial and advantageous possibility for mounting, maintenance and repair, wherein, by simple structural aids, the respective drive unit can be released from the slide and again connected thereto in a simple manner. An additional alternative aspect of the present invention is that, during the demounted state of the press, the complete slide has the possibility of transport/deposition, such as, for example, on a sliding table or, for example, traveling table or similar subassembly of the press, and therefore the slide can be moved out of the press and moved thereinto again in a simple manner.

In an embodiment, the present invention provides a connection arrangement of a force- and movement-transmitting drive unit which includes a press comprising at least a drive unit, a slide and a part with a thread. The drive unit is mounted at a pull or push point of the slide. A first connecting element comprises a nut configured to be mounted movably in the slide. The first connecting element and the part of the drive unit form a releasable connection. An additional connecting part with a thread. The part of the drive unit is configured so as to be releasably connected to the additional connecting part. The drive unit is connected to the slide via the releasable connection. The first connecting element is mounted movably in the slide. When the drive unit is in a released state or in a removed state, the additional connecting part is configured to be separated from the part of the drive unit so as to at least partially remain in the first connecting element or in the releasable connection. During a remounting of the drive unit, the part of the drive unit is connected extendably to the additional connecting part. The releasable connection is configured to comprise the part of the drive unit or the additional connecting parts with the thread corresponding to the nut.

BRIEF DESCRIPTION OF THE DRAWINGS

The present invention is described in greater detail below on the basis of embodiments and of the drawings in which:

FIG. 1a shows a cross-sectional view of the connection arrangement according to the present invention in an operating phase; and FIG. 1b shows a cross-sectional view of the connection arrangement of FIG. 1a in a demounting phase.

DETAILED DESCRIPTION

In an embodiment of the present invention, the connection arrangement of a force- and movement-transmitting drive unit designed, for example, as a pull or push element, on a slide of a press having at least one drive unit mounted in each case at a pull or push point of the slide is connected to the slide by means of a releasable connection formed by a part of the drive unit and a first connecting element connected to the slide, the first connecting element being mounted movably in the slide and said part being connected releasably to an additional connecting part.

In an embodiment of the present invention, the drive unit can, for example, be released or removed, the additional connecting part can be separated from the part and can remain at least partially in the first connecting element or the releasable connection. During remounting of the drive unit, the part can, for example, be connected extendably to the additional connecting part. The part has a thread. The first connecting element is a nut mounted movably in the slide.

The additional connecting part has a thread. The releasable connection is designed as a thread matching with the part or with the additional connecting part and the nut.

In an embodiment of the present invention, the pull element can, for example, be a pull rod, and the pull or push point can be a point of action of the pull rod on the slide.

The first connecting element may be designed as a threaded nut, locking element or frictional clamping element, for which purpose the releasable compatible connection may constitute a thread or a mechanical, hydraulic or pneumatic locking unit.

The part of the drive unit may constitute a portion of the drive unit which is designed such that it can be connected positively by means of a thread or interlock or nonpositively by means of friction.

The additional connecting part as a releasable element can be implemented according to the type of releasable connection.

In a functionally advantageous design, the first connecting element can be manipulated or can be driven by means of a gear, specifically, such that it can be put into the corresponding positive or nonpositive releasable connecting action.

The present invention can be implemented and applied in several respects or embodiments.

There is firstly a provision whereby, when the slide is in operation, the additional connecting part is connected releasably to the part of the drive unit outside the first connecting part or the additional connecting part is separated from the drive unit.

The first connecting element can furthermore be manipulated or can be driven for the purpose of an adaptable installation height and a variable vertical position of the slide.

Irrespective therefrom, for demounting the drive unit, the latter can be released or can be removed from the releasable connection by means of the manipulatable or drivable first connecting element, while, with the drive unit released or removed, the additional connecting part can be separated from the part of the drive unit and can remain at least partially in the first connecting element or the releasable connection.

The additional connecting part can furthermore be connected releasably and fixably by means of a second connecting element.

The part of the drive unit can be designed for the first connecting element. The first connecting element can be designed as a connecting element, mounted movably in the slide, for said part, and the additional connecting part can be designed positively or nonpositively for the releasable connection.

The present invention has an advantageous effect even during an initial mounting, then again during demounting and remounting for maintenance purposes, and finally when a press is in operation.

Thus, for example, as early as during the initial mounting of a press with a bottom drive, by the first connecting element being manipulated, such as the nut being turned on the threaded part of the drive unit, such as a pull rod, the slide can be changed in its vertical position and can thus be adapted to the installation height of a respective die, such as a die top part fastenable to the slide and/or a die bottom part attached to a platen of the press.

During demounting of the slide for maintenance purposes, the latter can be deposited on a functional group, such as, for example, a traveling table or sliding table, belonging to this press. By means of a synchronously controlled downward movement of the pull rod by means of the driven turning of the nut, the pull rod can be moved downward out of the thread. During subsequent remounting, the thread of the pull rod can easily be introduced in alignment into the thread of the nut so that no damage to the releasable connection designed as a matching thread occurs. For this purpose, the pull rod having the thread is extended by the additional connecting part in the manner of a threaded stub. In order to provide the aligned position of the thread flanks of the pull rod in relation to the position of said threaded stub, the latter is connected with arresting action to the pull rod via at least one locating element, such as a feather key, and is fixed via the second connecting element, such as a screw.

The manufacture of the thread on the pull rod and on the threaded stub can be carried out in a technologically beneficial way in one pass during the previous mounting of the two parts.

During demounting of the slide, the procedure is as described above, but, with an increasing downward movement of the pull rod by the actuation of the synchronously moved nut, the operation is continued until the threaded stub is introduced completely into the releasable connection constituting the thread, so that the feather key is positioned underneath the thread of the nut. The screw can then be released and the pull rod can be lowered downward completely.

The slide can then be moved out of the press, for example, by means of an available traveling table. During subsequent remounting, it is necessary to merely provide that the feather key of the pull rod is positioned correctly with respect to the corresponding groove in the threaded stub.

Thereafter, by the pull rod being raised, the feather key can be introduced into the corresponding groove and then, by the actuation of the nut and the synchronous actuation of the pull rod, the latter can again be introduced into the thread of the nut.

The application of the present invention is described below by means of different functional phases of a press with bottom drive, not illustrated, in which the slide may have a plurality of pull rods, preferably acting in pairs.

Apart from the following exemplary embodiment, the inventive principle of the connection arrangement can also be applied to a press with bottom drive in which the respective releasable connection is not made by means of a positive thread, but instead both by means of positive locking elements and by means of nonpositively acting machine elements, such as, for example, frictionally.

The same also applies similarly to presses with top drive in which the connection arrangement is designed, via a force- and movement-transmitting drive unit acting upon the slide at a push point, as a push element, wherein, likewise, by means of a releasable slide connection formed by a part of the drive unit and a first connecting element connected to the slide, the first connecting element is mounted movably in the slide, and the part of the drive unit is connected releasably to an additional connecting part.

The shown exemplary embodiment is a press with bottom drive, not illustrated, in which a drive device arranged in a substructure provides a stroke-executing slide 5 which receives, for example, a die upper part and which has at least one pull rod, acting at a pull point 2, as a drive unit 1. In relation to a die lower part arranged in the substructure, the corresponding die upper part is intended to machine or deform a workpiece, as is likewise not illustrated here, but is familiar to a person skilled in the art. It must also be assumed that the present invention achieves effects which influence subassemblies connected functionally to the press, such as the use of a traveling table or sliding table, likewise not illustrated here.

According to FIGS. 1a and 1b, the connection arrangement according to the present invention essentially comprises at least one pull rod 1 acting on the slide 5 in each case at a pull point 2 and having a part 1.1, to which a releasable additional connecting part 1.2 with a thread is assigned in the manner of a threaded stub, a locating element 1.3, such as a feather key, and a second connecting element 1.4, such as a screw, for the alignment of the part 1.1 with, and releasable connection thereof to, the additional connecting part, such as the threaded stub 1.2.

A first connecting element, such as a nut 4, adjustable by means of a gear 1.5 forms with the part 1.1 a corresponding releasable connection, such as a thread 3.

As illustrated in FIG. 1a, the pull rod 1 is connected to the pull point 2 via the thread 3 formed by the part 1.1 and the nut 4. By the nut 4 being turned, in this case by means of the gear 1.5, the slide 5 can be changed in its vertical position and can thus be adapted, for example, to the installation height of the respective die (die upper part, die lower part), not illustrated. For demounting the slide 5, this slide can be deposited on the traveling table or sliding table. By means of a downward movement of the pull rod 1 brought about synchronously by the nut 4 being operated, said pull rod 1 can be moved downward out of the thread 3. During subsequent remounting, the part 1.1 of the pull rod 1 is introduced in alignment into the nut 4. Thread damage is thus advantageously avoided. On the part 1.1, the releasable additional threaded part, such as the threaded stub 1.2, is assigned as an extension to the pull rod 1, specifically in respect of the functions of the present invention described below.

In order to provide the position of the thread flanks of the pull rod part 1.1 with respect to the position of the threaded stub 1.2, the latter is connected via at least one locating element, such as the feather key 1.3, to the part 1.1 by means of the fixing connecting element, such as the screw 1.4. The production of the two threads on the part 1.1 and on the threaded stub 1.2 has already taken place in a technologically expedient way as a result of the previous mounting of the two parts in one joint manufacturing pass as a work cycle.

During the possible demounting of the slide 5, the procedure is as described above, the slide 5 having a substructure to absorb its weight. With increasing downward movement of the pull rod 1 by the actuation of the synchronously moved nut 4, the operation is continued until the threaded stub 1.2 is introduced completely into the thread 3. In this case, the feather key 1.3 lies beneath the thread of the nut 4. The screw 1.4 is then released and the pull rod 1 is lowered downward completely. FIG. 1 b illustrates this corresponding position with the threaded stub 1.2 separated from the part 1.1. The slide 5 is deposited, for example, on the traveling table can thus be brought out of the press. During subsequent remounting, the feather key 1.3 of the pull rod 1 is positioned correctly with respect to a corresponding recess, such as a groove, in the threaded stub 1.2. Then, by the pull rod 1 being raised, the feather key 1.3 can be introduced into the corresponding groove and, by the actuation of the nut 4 and the synchronous actuation of the pull rod 1, the latter can be introduced into the thread of the nut 4 again.

According to the inventive teaching implemented by this example, a person skilled in the art can proceed for presses both with a bottom drive and with a top drive, using correspondingly acting machine elements and releasable types of connection. The invention can thus be used for a wide range of presses, on the one hand, economically for the manufacturer and, on the other hand with the effect of increasing serviceability for the operator, in the latter case particularly in the setting-up phases and during maintenance and repair work.

The present invention is not limited to embodiments described herein; reference should be had to the appended claims.

LIST OF REFERENCE SYMBOLS

1 Drive unit, pull or push element, pull rod
1.1 Part of the drive unit
1.2 Additional connecting part (threaded stub)
1.3 Locating element, feather key
1.4 Second connecting element, screw
1.5 Gear
2 Pull or push point
3 Releasable connection, thread
4 First connecting element, nut
5 Slide

What is claimed is:

1. A connection arrangement of a force- and movement-transmitting drive unit, the connection arrangement comprising:
a press comprising a drive unit comprising a drive unit part with an outer thread, and a slide, the drive unit being mounted at a pull or push point of the slide;
a releasable connection;
a first connecting element comprising a nut with an inner thread, the first connecting element being configured to be mounted movably in the slide, the first connecting element and the drive unit part forming the releasable connection;
an additional connecting part with an outer thread, the drive unit part being configured so as to be releasably connected to the additional connecting part, and
at least one locating element,
wherein, the drive unit is connected to the slide via the releasable connection,
wherein, the first connecting element is mounted movably in the slide,
wherein, during a remounting of the drive unit, the drive unit part connected extendably to the additional connecting part,
wherein, for an aligned position of the drive unit part in relation to the position of the additional connecting part, the additional connecting part is connectable to the drive unit part via the at least one locating element,
wherein, the releasable connection is configured to comprise the drive unit part or the additional connecting part with the thread corresponding to the nut, and
wherein the additional connecting part and the drive unit part are each configured so that their respective outer thread meshes with the inner thread of the first connecting element.

2. The connection arrangement as recited in claim 1, wherein the drive unit is provided as a pull element or as a push element.

3. The connection arrangement as recited in claim 1, further comprising a gear, wherein the first connecting element is configured to be manipulated or driven by the gear.

4. The connection arrangement as recited in claim 1, wherein, when the slide is in an operating state, the additional connecting part is connected releasably to the drive unit part outside the first connecting element.

5. The connection arrangement as recited in claim 1, wherein, when the slide is in an operating state, the additional connecting part is separated from the drive unit part.

6. The connection arrangement as recited in claim 1, wherein the first connecting element is configured to be manipulated or driven so as to adapt an installation height and a variable vertical position of the slide.

7. The connection arrangement as recited in claim 6, wherein, for a demounting of the drive unit, the drive unit is configured to be released or to be removed out of the releasable connection via the manipulatable or drivable first connecting element.

8. The connection arrangement as recited in claim 1, wherein, when the drive unit is in a released state or in a removed state, the additional connecting part is configured to be separated from the drive unit part so as to remain at least partially in the first connecting element or in the releasable connection.

9. The connection arrangement as recited in claim 1, further comprising a second connecting element, wherein the additional connecting part is configured to be connected releasably and fixably to the drive unit part via the second connecting element.

10. The connection arrangement as recited in claim 1, wherein,
    the drive unit part configured for the first connecting element,
    the first connecting element configured as a connecting element mounted movably in the slide to the drive unit part, and
    the additional connecting part,
are provided in an interlocking manner or in a force-fitting manner for the releasable connection.

* * * * *